United States Patent
Li et al.

(10) Patent No.: US 11,143,423 B2
(45) Date of Patent: *Oct. 12, 2021

(54) GROUP DYNAMIC ENVIRONMENTAL CONTROL SYSTEM AND METHOD OF OPERATION

(71) Applicant: Carrier Corporation, Jupiter, FL (US)

(72) Inventors: Keyu Li, Shanghai (CN); Jinlei Ding, Shanghai (CN); Hayden M. Reeve, West Hartford, CT (US); Danqing Sha, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/467,363

(22) PCT Filed: Dec. 1, 2017

(86) PCT No.: PCT/US2017/064123
§ 371 (c)(1),
(2) Date: Jun. 6, 2019

(87) PCT Pub. No.: WO2018/106522
PCT Pub. Date: Jun. 14, 2018

(65) Prior Publication Data
US 2020/0088427 A1    Mar. 19, 2020

Related U.S. Application Data

(60) Provisional application No. 62/431,063, filed on Dec. 7, 2016.

(51) Int. Cl.
*F24F 11/00*    (2018.01)
*F24F 11/30*    (2018.01)
(Continued)

(52) U.S. Cl.
CPC .............. *F24F 11/30* (2018.01); *F24F 11/50* (2018.01); *F24F 11/64* (2018.01); *F24F 11/65* (2018.01);
(Continued)

(58) Field of Classification Search
CPC ........ F24F 2120/20; F24F 11/50; F24F 11/30; F24F 11/65; F24F 11/64; G05B 13/042
See application file for complete search history.

(56) References Cited

U.S. PATENT DOCUMENTS

| | | |
|---|---|---|
| 5,170,935 A | 12/1992 | Federspiel et al. |
| 5,762,265 A | 6/1998 | Kitamura et al. |

(Continued)

FOREIGN PATENT DOCUMENTS

| | | |
|---|---|---|
| CA | 2329002 A1 | 10/1999 |
| CN | 102110243 A | 6/2011 |

(Continued)

OTHER PUBLICATIONS

ISR for Application No. PCT/US2017/064123 dated Mar. 1, 2018; 5 pages.

(Continued)

*Primary Examiner* — Mohammad Ali
*Assistant Examiner* — Vincent W Chang
(74) *Attorney, Agent, or Firm* — Cantor Colburn LLP

(57) ABSTRACT

A method of conditioning an environment includes generating, by a group feedback analysis system, a first comfort limit based on a first plurality of data points corresponding to user feedback of a group of users in an environment conditioned by an environmental conditioning system, and each associated with temperature and humidity environmental criterions. The method further includes generating a second comfort limit based on a second plurality of data points corresponding to user feedback of the group of users, (Continued)

and associated with the temperature and humidity environmental criterions. The method identifies a constrained comfort zone defined by the first comfort limit, the second comfort limit, predefined lower and upper bounds for the temperature environmental criterion, and predefined lower and upper bounds for the humidity environmental criterion. The environmental system is controlled to maintain the temperature and humidity environmental criterions within the constrained comfort zone.

18 Claims, 4 Drawing Sheets

(51) Int. Cl.
    *F24F 11/50*     (2018.01)
    *F24F 11/64*     (2018.01)
    *F24F 11/65*     (2018.01)
    *G05B 13/04*     (2006.01)
    *F24F 110/20*     (2018.01)
    *F24F 120/20*     (2018.01)
    *F24F 110/10*     (2018.01)

(52) U.S. Cl.
CPC ........ *G05B 13/042* (2013.01); *F24F 2110/10* (2018.01); *F24F 2110/20* (2018.01); *F24F 2120/20* (2018.01)

(56) References Cited

U.S. PATENT DOCUMENTS

| | | | |
|---|---|---|---|
| 6,070,110 | A | 5/2000 | Shah et al. |
| 6,145,751 | A | 11/2000 | Ahmed |
| 6,557,771 | B2 | 5/2003 | Shah |
| 6,763,338 | B2 | 7/2004 | Kirshenbaum |
| 6,898,943 | B2 | 5/2005 | Tanaka |
| 7,172,118 | B2 | 2/2007 | Urken |
| 8,140,191 | B2 | 3/2012 | Kanai et al. |
| 8,457,796 | B2 | 6/2013 | Thind |
| 8,977,405 | B2 | 3/2015 | Shiel |
| 9,020,647 | B2 | 4/2015 | Johnson et al. |
| 2007/0138307 | A1 | 6/2007 | Khoo |
| 2010/0262298 | A1* | 10/2010 | Johnson ............. F24F 11/30 700/277 |
| 2010/0332373 | A1 | 12/2010 | Crabtree et al. |
| 2012/0031984 | A1 | 2/2012 | Feldmeier et al. |
| 2012/0150788 | A1* | 6/2012 | Berg-Sonne ........ G05B 15/02 706/48 |
| 2012/0232715 | A1* | 9/2012 | Vass ................... G01K 1/045 700/300 |
| 2013/0048263 | A1 | 2/2013 | Nouvel et al. |
| 2013/0090767 | A1 | 4/2013 | Bruck et al. |
| 2013/0134229 | A1 | 5/2013 | Jang et al. |
| 2013/0163046 | A1 | 6/2013 | Narahashi et al. |
| 2014/0358291 | A1 | 12/2014 | Wells |
| 2014/0358294 | A1 | 12/2014 | Nichols et al. |
| 2015/0204560 | A1* | 7/2015 | Takahashi ............. F24F 11/30 700/276 |
| 2016/0123617 | A1* | 5/2016 | Vega .................. G06N 20/00 706/12 |
| 2016/0131383 | A1 | 5/2016 | Zhao et al. |
| 2017/0030606 | A1* | 2/2017 | McLean .............. G06Q 10/06 |
| 2017/0032459 | A1* | 2/2017 | Kaminski ........... G06F 16/951 |

FOREIGN PATENT DOCUMENTS

| | | |
|---|---|---|
| CN | 102597639 A | 7/2012 |
| CN | 102736649 A | 10/2012 |
| CN | 102812303 A | 12/2012 |
| CN | 202677236 U | 1/2013 |
| CN | 103322642 A | 9/2013 |
| EP | 0786712 A2 | 7/1997 |
| EP | 3029389 A2 | 8/2016 |
| GB | 2448896 A | 11/2008 |
| WO | 2010111444 A1 | 9/2010 |
| WO | 2014059123 A1 | 4/2014 |

OTHER PUBLICATIONS

Written Opinion for Application No. PCT/US2017/064123 dated Mar. 1, 2018; 7 pages.
Hochbaum, Dorit S., et al., "Methodologies and Algoritms for Group-Rankings Decision", Management Science, vol. 52, No. 9, Sep. 2006, pp. 1394-1408.
Jackson, Keith, et al., "Pareto Analysis Using the 80:20 Rule to Prioritize", www.mindtools.com, accessed Sep. 10, 2015, 6 pages.
Naadimuthu, G., et al., "Application of an adaptive neural fuzzy inference system to thermal comfort and group technology problems", Computers and Mathematics with Applications 54 (2007), pp. 1395-1402.
Rodriguez, Marko A., "Social Decision Making with Multi-Relational Networks and Grammar-Based Particle Swarms", ariXiv:cs/0609034v1, Sep. 7, 2006, 10 pages.
Zhao et al.; "Experimental Study of Group Thermal Comfort Model"; 2014 IEEE International Conference on Automation Science and Engineering (CASE); Taipei, Taiwan, Aug. 18-22, 2014; Retrieved from Internet https://www.researchgate.net; 5 pages.
Meyer et al.; U.S. Appl. No. 09/679,903 entitled "System for processing interior environment complaints from building occupants" filed with USPTO Oct. 5, 2000; Published as USH2176 on Dec. 5, 2006; 15 pages.

* cited by examiner

| USER INPUT | USER ID | TIME | LOCATION | CV1 | CV2 | CV1 SETTING | CV2 SETTING | WEIGHT |
|---|---|---|---|---|---|---|---|---|
| 0 | 1 | 08:00 | A1 | 22 | 20 | 21 | 20 | 0 |
| 1 | 2 | 09:55 | B3 | 20 | 20 | 21 | 20 | 1 |
| 2 | 1 | 11:30 | A1 | 22 | 30 | 21 | 20 | .5 |
| 3 | 3 | 14:22 | A2 | 24 | 20 | 21 | 20 | 1.5 |
| 4 | 1 | 14:45 | A1 | 24 | 20 | 20 | 15 | .5 |

*FIG. 2*

GROUP DYNAMIC ENVIRONMENTAL CONTROL SYSTEM AND METHOD OF OPERATION

CROSS-REFERENCE TO RELATED APPLICATIONS

This application claims the benefit of PCT/US2017/064123 filed Dec. 1, 2017, which claims priority to U.S. Provisional Application No. 62/431,063 filed Dec. 7, 2016, which is incorporated herein by reference in its entirety.

BACKGROUND

The present disclosure relates to an environmental control system, and more particularly, to a group dynamic environmental control systems and method of operation.

Environmental control systems, such as heating, ventilating, and air-conditioning (HVAC) systems maintain high standards of service by keeping the environment in a building within the comfort zone of occupants of the building. One method for quantifying the comfort level of occupants is the predicted mean vote-predicted percent dissatisfied (PMV-PPD) model. The PMV-PPD model quantifies the thermal comfort concept as a mapping from environmental factors, such as air temperature, radiant temperature, relative humidity, and air velocity, as well as personal factors such as clothing level, metabolic rate, and activity level of the occupants. This and other systems use average thermal comfort models to calculate average thermal comfort levels that HVAC systems may use to control an environment in a building.

However, HVAC systems utilizing average thermal comfort levels still can have high levels of user discomfort.

SUMMARY

A method of conditioning an environment according to one, non-limiting embodiment of the present disclosure includes generating, by a group feedback analysis system, a first comfort limit based on a first plurality of data points each associated with temperature environmental criterion combined with a humidity environmental criterion, and corresponding to user feedback of a group of users in an environment conditioned by an environmental conditioning system; generating, by the group feedback analysis system, a second comfort limit based on a second plurality of data points each associated with the temperature environmental criterion combined with the humidity environmental criterion, and corresponding to user feedback of the group of users in the environment, wherein the first comfort limit is opposite the second comfort limit; identifying, by the group feedback analysis system, a constrained comfort zone defined by the first comfort limit, the second comfort limit, predefined lower and upper bounds for the temperature environmental criterion, and predefined lower and upper bounds for the humidity environmental criterion; and controlling the environmental conditioning system to maintain the temperature and humidity environmental criterions within the constrained comfort zone.

Additionally to the foregoing embodiment, generating the first comfort limit comprises analyzing the first plurality of data points to identify outliers, and forming the first comfort and second comfort limit to exclude the outliers.

In the alternative or additionally thereto, in the foregoing embodiment, the method includes receiving, at a user input device, a user input registering a comfort level of a user; identifying a value of the combined temperature and humidity environmental criterions associated with an environment of the user and the user input as being an outlier relative to one or both of the first and second comfort limits; and disregarding the user input based on identifying the value of the combined temperature and humidity environmental criterion as being an outlier.

In the alternative or additionally thereto, in the foregoing embodiment, the method includes receiving, at a user input device, a user input registering a comfort level of a user; identifying a value of the combined temperature and humidity environmental criterions associated with an environment of the user and the user input as being an outlier relative to one or both of the first and second comfort limits; and providing feedback to the user at the user input device indicating that the value of the combined temperature and humidity environmental criterions associated with the environment of the user is an outlier.

In the alternative or additionally thereto, in the foregoing embodiment, the method includes generating a prompt on the user input device to prompt the user to change the user input to correspond to a different value of the combined temperature and humidity environmental criterion.

In the alternative or additionally thereto, in the foregoing embodiment, the method includes assigning a weight to each user input making up the user feedback of the group of users.

In the alternative or additionally thereto, in the foregoing embodiment, the weight is assigned based on at least one of (i) an identity of a user associated with the user input, (ii) a duration of time that the user is in an environment associated with the user, and (iii) a number of complaints, defined as user feedback inputs indicating discomfort, generated by the user.

In the alternative or additionally thereto, in the foregoing embodiment, generating the first and second comfort limits includes receiving a plurality of user inputs to a plurality of user input devices; sensing values of the temperature and humidity environmental criterions in one or more enclosed environments based on the plurality of user inputs; associating the user inputs with the sensed values of the temperature and humidity environmental criterions; and generating the first and second comfort limits based on the sensed values of the temperature and humidity environmental criterions.

In the alternative or additionally thereto, in the foregoing embodiment, the method includes establishing, by the group feedback analysis system, a minimum energy setpoint for the combined temperature and humidity environmental criterions within the constrained comfort zone; establishing, by the group feedback analysis system, a maximum comfort setpoint for the combined temperature and humidity environmental criterions within the constrained comfort zone; and selecting a control setpoint directly located between the minimum energy and maximum comfort setpoints for control of the environmental conditioning system.

In the alternative or additionally thereto, in the foregoing embodiment, establishing the minimum energy setpoint includes establishing the enthalpy of external ambient air; calculating enthalpies of the first and second plurality of data points that lie within the constrained comfort zone; and selecting a data point having the closest enthalpy to the enthalpy of the external ambient air as the minimum energy setpoint.

In the alternative or additionally thereto, in the foregoing embodiment, establishing the maximum comfort setpoint includes averaging the first and second plurality of data points that lie within the constrained comfort zone.

An environmental control system according to another, non-limiting, embodiment includes a feedback analysis system configured to receive feedback from a group of users corresponding to a comfort level of the users in a group environment in which the group of users is located, to generate data including a first comfort limit and a second comfort limit, the first comfort limit corresponding to the feedback from the group of users at a first extreme of a combined temperature and humidity environmental criterions and the second comfort limit corresponding to the feedback from the group of users at a second extreme of the combined temperature and humidity environmental criterions opposite the first extreme, and the feedback analysis system further configured to identify a constrained comfort zone bounded by the first comfort limit, the second comfort limit, upper and lower bounds of the temperature environmental criterion, and upper and lower bounds of the humidity environmental criterion, and to generate control signals for an environmental conditioning system to maintain the group environment within the constrained comfort zone.

Additionally to the foregoing embodiment, the feedback analysis system is configured to identify outlier user feedback data points and to form the first and second comfort limits to exclude the outlier user feedback data points.

In the alternative or additionally thereto, in the foregoing embodiment, the environmental control system includes one or more user input devices to receive inputs from users registering a comfort level of the users, wherein the feedback analysis system is configured to generate user feedback data points by identifying temperature and humidity values of the respective temperature and humidity environmental criterions associated with an environment of the users based on the inputs received from the users.

In the alternative or additionally thereto, in the foregoing embodiment, the feedback analysis system is configured to assign a weight to each user input making up the user feedback of the group of users.

In the alternative or additionally thereto, in the foregoing embodiment, the first comfort limit and the second comfort limit are retrieved from a user profile, wherein the user profile is stored on a user device located in the group environment, stored on a remote server or stored in a cloud environment.

In the alternative or additionally thereto, in the foregoing embodiment, the feedback analysis system is configured to establish a minimum energy setpoint for the combined temperature and humidity environmental criterions within the constrained comfort zone, establish a maximum comfort setpoint for the combined temperature and humidity environmental criterions within the constrained comfort zone, and select a control setpoint directly located between the minimum energy and maximum comfort setpoints for control of the environmental conditioning system.

In the alternative or additionally thereto, in the foregoing embodiment, the feedback analysis system is configured to establish an ambient air enthalpy, calculate data point enthalpies for each of the first and second data points that lie within the constrained comfort zone, and select a data point having the closest data point enthalpy to the ambient air enthalpy as the minimum energy setpoint.

In the alternative or additionally thereto, in the foregoing embodiment, the feedback analysis system is configured to establish the maximum comfort setpoint by averaging the first and second plurality of data points that lied within the constrained comfort zone.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 2 illustrates a table for storing user input data according to an embodiment;

DETAILED DESCRIPTION OF THE INVENTION

Conventional environmental control systems may not provide control to individual users when the system provides environmental conditioning for a group of users. Embodiments relate to an environmental conditioning system that conditions the environment in which a group of users is located based on analyzing feedback from multiple users in the environment.

Figure 1:
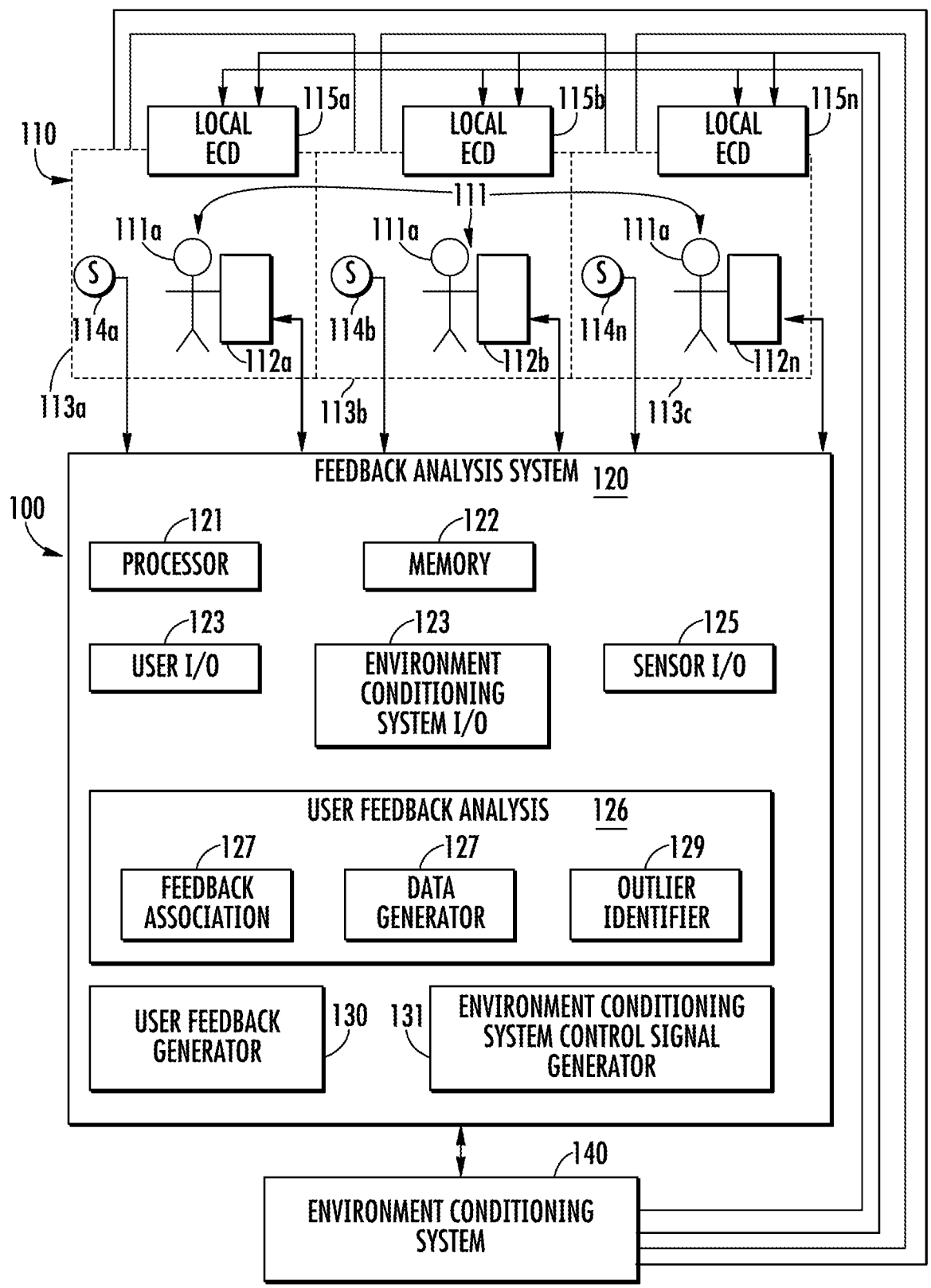
FIG. 1 is a diagram of an environmental control system according to one embodiment.

FIG. 1 is a block diagram of an environmental control system 100 according to an embodiment of the invention. The environmental control system includes a group environment 110 or zone in which a plurality of users 111a, 111b ... 111n, also referred to as a group 111 of users, is located. The group environment 110 may be made up of distinct regions, or individual environments 113a, 113b ... 113n corresponding to the users 111a, 111b ... 111n. The individual environments 113a to 113n are geographic regions associated with each user 111a to 111n. Examples of geographic regions include separate offices, separate cubicles, separate regions that are not divided by physical structures, or any other separate regions. Multiple users may also be located in a single zone or environment, such as in a theater, cafeteria, auditorium, etc.

The system 100 includes a feedback analysis system 120 that receives feedback from among the group 111 of users to condition the group environment 110. An environmental conditioning system 140 conditions the group environment 110 based on the feedback from the group 111 of users and the control signals from the feedback analysis system 120.

In operation, the group of users in the group environment 110 provide feedback to the feedback analysis system 120 by entering data, or user inputs, into user, or user feedback, devices 112a, 112b ... 112n.

In one embodiment, the user feedback devices 112a, 112b ... 112n have only binary selection options available for user selection. For example, a binary selection may include "too hot" or "too cold." In another embodiment, the user feedback devices 112a, 112b ... 112n may have only tertiary selection options. An example of a tertiary selection option may be "too hot," "too cold," and "comfortable." In general terms, a binary selection option may include discomfort selection options at opposite extremes of an environmental criterion, and a tertiary selection option may include the discomfort selection options at opposite extremes of the environmental criterion and a comfort selection option. In the present specification and claims, reference to "opposite extremes" of an environmental condition means that one extreme corresponds to an abundance of the environmental criterion (such as high levels of heat or high levels of humidity) and an opposite extreme corresponds to a paucity of the environmental criterion (such as low heat or low humidity). The extremity of the environmental condition is an objective and measurable value (such as a measure of a magnitude of heat or magnitude of humidity), while the level of the environmental condition between the extremes that causes discomfort is a subjective value for each user 111a . . . 111n identified with user feedback.

In one embodiment, an environmental criterion is temperature, so that a user 111a . . . 111n provides input regarding how the temperature feels to the user 111a . . . 111n. However, embodiments of the invention are not limited to any single environmental criterion. Other examples of environmental criteria include humidity (e.g. "too humid/too dry"), light levels (e.g. "too much light/too dark"), draftiness (e.g. "too much airflow/too stuffy"), or any other environmental criteria sensed by a user and measurable and controllable by the environmental conditioning system 140.

In another embodiment, a unitary selection option is provided on the user feedback devices 112a . . . 112n to indicate "discomfort." In such an embodiment, the environmental conditions may be sensed to estimate whether the "discomfort" selection likely corresponds to an indication of "too hot" or "too cold," or any other analyzed environmental criterion or combination of criteria. For example, if user 111a indicates that they are uncomfortable, the status of the environmental criteria may be sensed by sensors 114a, 114b . . . 114n, and the sensor data may be provided to the feedback analysis system 120. The feedback analysis system 120 may then determine which extreme of an environmental criterion the "discomfort" likely corresponds to. For example, if the sensor 114a detects that the user environment 113a is warmer than average, the feedback analysis system 120 may infer or assume that the "discomfort" selection likely refers to the user 111a being too warm. In addition, the feedback analysis system 120 may refer to past complaints by the user 111a to determine the likely reasons for the user's 111a complaint.

In alternative embodiments, the selection criteria may include additional selection levels to indicate degrees of discomfort, such as "strongly too cold," "somewhat too cold," "somewhat too warm," and "strongly too warm," although any other environmental criteria may be analyzed. In some embodiments, the comfort selection options do not correspond to desired temperatures, such as a thermostat, or in other words, users do not select a desired temperature. Instead, the users 111a . . . 111n provide feedback regarding their comfort level at a given temperature, or at the temperature in the user's present environment. In particular, instead of requesting a particular temperature of 70 degrees Fahrenheit, as with a thermostat, the user 111a . . . 111n indicates that they are "too warm" or "too cold," providing feedback on how they feel in their environment.

In one embodiment, the user feedback devices 112a . . . 112n are dedicated devices that are used only to provide feedback regarding environmental criteria. Such a device may be a wired or wireless handheld controller, for example, having only the buttons or other physical structures to allow the user to select a comfort-level feedback selection. In other embodiments, the user feedback devices 112a . . . 112n may be smart phones, tablet computers, laptops, personal computers, or any other computing devices capable of receiving a user selection and transmitting the user selection to the feedback analysis system 120 via wires or wirelessly. User feedback devices 112a . . . 112n may be wearable devices, such as smartwatches, head-mounted computing devices (e.g., eyewear), wristbands, etc.

The feedback analysis system 120 is made up of one or more processors 121 and memory 122, as well as any other logic, passive electronic components, and other circuitry to perform the functions of receiving data, analyzing the data, generating control signals, and generating other data based on the received data. The feedback analysis system 120 includes a user input/output (I/O) module 123 for receiving feedback from users via the user feedback devices 112a . . . 112n. The user I/O module 123 may include one or more wired ports for connecting with physical wires that transmit data between the feedback analysis system 120 and the user feedback devices 112a . . . 112n, one or more antenna for transmitting and/or receiving data wirelessly, signal processing circuitry for performing signal processing, such as error correction, signal modulation, or any other processing of the signal to allow the data in the signal to be analyzed by the feedback analysis system 120.

The feedback analysis system 120 further includes an environmental conditioning system I/O module 124 for receiving status data from the environmental conditioning system 140, such as the current setting of one or more environmental criteria, including temperature, humidity, or any other environmental criteria that may be controlled or conditioned by the environmental conditioning system. The environmental conditioning system I/O module 124 may be configured to update set points (i.e., control signals), and may include one or more wired ports for connecting with physical wires that transmit data between the feedback analysis system 120 and the environmental conditioning system 140, one or more antenna for transmitting and/or receiving data wirelessly, signal processing circuitry for performing signal processing, such as error correction, signal modulation, or any other processing of the signal to allow the data in the signal to be analyzed by the feedback analysis system 120, or to prepare data to be transmitted from the feedback analysis system 120 to the environmental conditioning system 140.

In one embodiment, the feedback analysis system 120 includes a sensor I/O module 125 for obtaining sensor data from the sensors 114a . . . 114n regarding the environmental criteria in the group environment 110.

The feedback analysis system 120 includes a feedback data analysis module 126. The feedback data analysis module 126 is represented as a block separate from the processor 121 and memory 122 for purposes of description, but the feedback data analysis module 126 includes computer instructions executed by the one or more processors 121 utilizing data obtained from one or more of the I/O modules 123, 124, and 125 and data in memory 122. The feedback data analysis module 126 includes a feedback association module 127, data generator 128, and outlier identifier 129. The feedback association module 127 analyzes user feedback data and environmental conditioning system data to associate a user feedback selection or entry with particular environmental conditioning system data. For example, in one embodiment the feedback association module 127 may access data stored in memory 122 indicating that a user input was received at 10:00 AM. The feedback association module 127 obtains environmental conditioning system data stored in memory indicating that at 10:00 AM, the environmental conditioning system was set at a temperature of 22 degrees Celsius. The feedback association module 127 then associates in memory 122 the user input with the temperature setting of 22 degrees Celsius. In some embodiments, the temperature recorded by the sensor 114 may be utilized as opposed to the set point.

In another embodiment, the data from the environmental conditioning system 140 is obtained in real-time. For example, the association module 127 may detect that a user input was received via the user I/O module 123 and may request data from the environmental conditioning system 140 based on detecting the received user input, and then may store the received data from the environmental conditioning system 140 in memory while associating the received environmental conditioning system data with the user input. The association may be performed by storing the data in a table and maintaining the data in associated portions of the table, such as in the same column or row, by using pointers to the data, or by any other means whereby a processor 121 may access the environmental conditioning system data by referring to stored user input data, received from a user feedback device 112a . . . 112n via the user I/O 123.

FIG. 2 illustrates an example of a table 200 that may be stored in memory 122 associating user inputs with environmental conditioning system data. The table may include data regarding a user input number, a user identifier (ID), a time at which a user feedback input is received, a location of the user, a value of a first environmental criterion (cv1), a value of a second environmental criterion (cv2), a setting of the first environmental criterion (cv1 setting), a setting of the second environmental criterion (cv2), and a weight assigned to a user or user input. For example, the environmental criterion values cv1 and cv2 may correspond to sensed criterion values that are sensed by the sensors 114a . . . 114n at the time that the user feedback input is received by the feedback analysis system 120. The environmental criterion setting values, on the other hand, may correspond to the settings of the environmental conditioning system 140 for the respective environmental criteria. For example, while an environmental conditioning system 140 may have a temperature level set for 22 degrees Celsius for the entire group environment 110, a sensor 114a in the individual environment 113a sense a temperature of 24 degrees Celsius due to the location of the environment 113a. Accordingly, the temperature at which the environmental conditioning system 140 is set may not be the temperature at which one or more of the separate environments 113a . . . 113n is maintained based on the setting.

Figure 3:
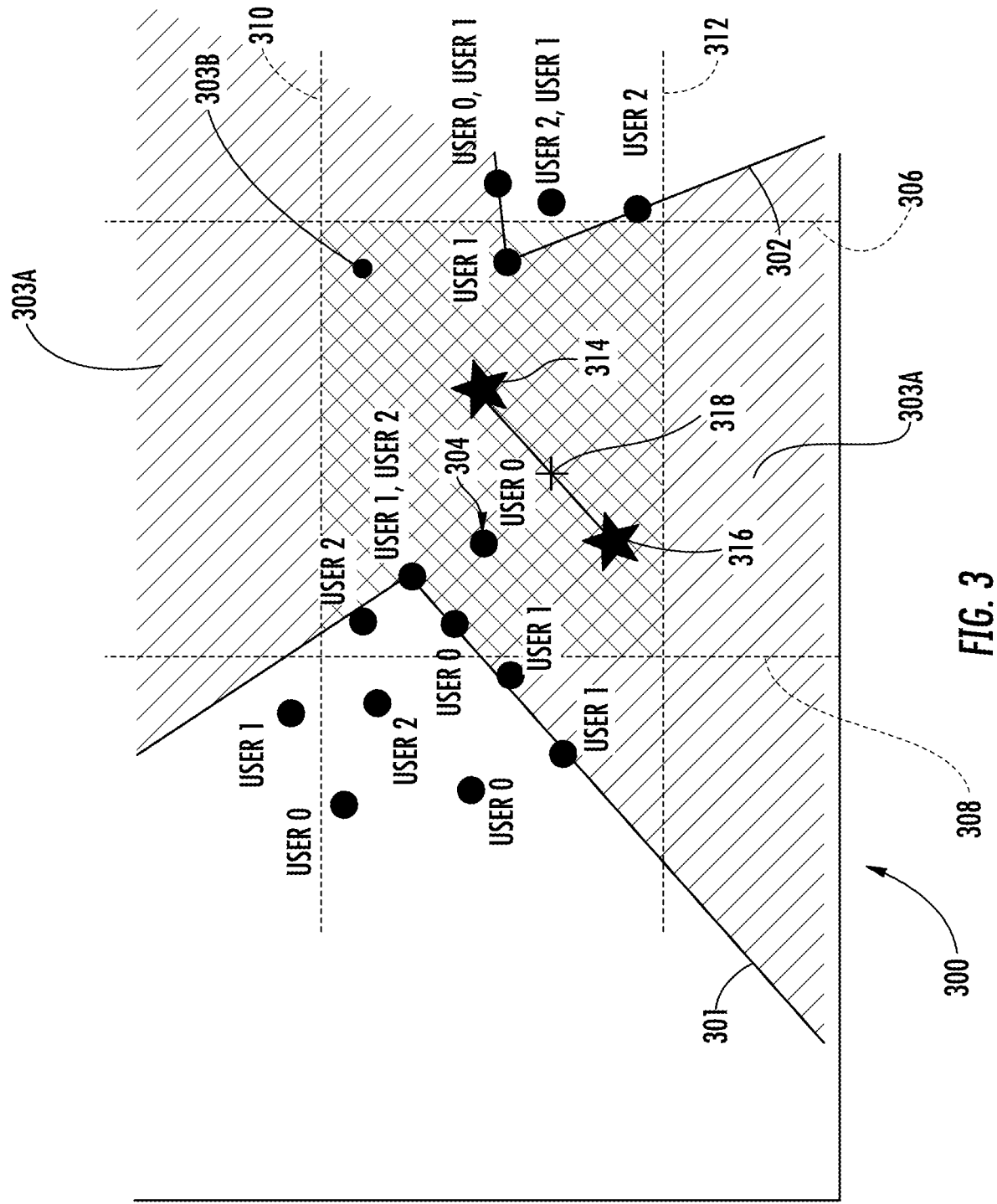
FIG. 3 illustrates a comfort limit graph according to one embodiment.

Referring again to FIG. 1, user feedback analysis module 126 of the feedback analysis system 120 includes a data generator 128. The data generator 128 generates data that, when graphed, represents one or more regions at extremes of two or more environmental criteria. FIG. 3 illustrates an example of a graph 300 representing the data according to one embodiment. It is understood that that data need not be graphed, and is shown in that format for ease of illustration.

Referring to FIG. 3, the graph 300 includes a first comfort limit 301 and a second comfort limit 302. The comfort limits are generated based on user feedback inputs, represented as dots generally among the data. The numbers 0, 1, and 2 in FIG. 3 adjacent to the dots represent different users (i.e. user 0, user 1, and user 2) in the same group environment 110 conditioned by the same environmental conditioning system 140. The graph 300 includes a horizontal axis representing temperature and a vertical axis representing humidity. However, embodiments are not limited to these criteria, but may include any environmental criteria. In embodiments of the invention, the data generator 128 compiles user data over a predetermined period of time to form a first comfort limit at one extreme of an environmental criterion and a second comfort limit at an opposite extreme of the environmental criterion. Referring to FIG. 3, the first comfort limit 301 corresponds to a "low temperature" extreme, and the second comfort limit 302 corresponds to a "high temperature" extreme opposite the low temperature extreme. In other words, the user inputs in the vicinity of the first comfort limit 301 represent users providing feedback indicating discomfort, such as by pressing a "too cold" button on a user feedback device 112a . . . 112n. The user inputs in the vicinity of the second comfort limit 302 represent users providing feedback indicating discomfort, such as by pressing a "too hot" button on the user feedback devices 112a . . . 112n.

In alternate embodiments, an individual may have their own comfort limits as part of a user profile stored in a local or user device (e.g., on a smart phone, tablet, RFID card, smart card, loyalty card). In this case, when the individual enters a new space the environmental control system 100 can add the user's comfort limits and not have to wait for feedback to create the comfort limit. The use of a pre-stored profile of comfort limits may apply to individuals or groups entering a new space. In other embodiments, an individual's comfort limits may be part of a user profile stored on a remote server or cloud system that is accessed by the environmental control system 100.

The first and second comfort limits 301 and 302 may be generated by curve-fitting, or by generating curves that most closely match the user inputs at the extremes of the at least one environmental criterion. One or more algorithms may be used to generate the first and second comfort limits 301 and 302, and fit the first and second comfort limits 301 and 302 to first and second curves. The data generator 128 analyzes the first and second comfort limits 301 and 302, and thereby identifies a comfort zone 303A (i.e., unconstrained comfort zone) between the first and second comfort limits in which a predetermined majority of users are likely to be comfortable. For example, the comfort zone 303A may define an area in which, based on user feedback, it is determined that 95% of the users will be comfortable. Although 95% is a predetermined level provided by way of example, a system may be designed to accommodate any predetermined user satisfaction level.

In general, the unconstrained comfort zone 303A may be further minimized to a constrained comfort zone 303B, wherein the comfort zone 303B may lie within the unconstrained comfort zone 303A but is further constrained by application of prescribed upper and lower bounds for each environmental criterion. For example, a first environmental criterion may be associated with temperature (i.e., x-axis in FIG. 3), and a second environmental criterion may be associated with humidity (i.e., y-axis in FIG. 3). Upper and lower temperature bounds 306, 308 may be illustrated as vertical lines, upper and lower humidity bounds 310, 312 may be illustrated as horizontal lines. The bounds 306, 308, 310, 312 may, or may not, intersect one or both of the comfort limits 301, 302. The bounds 306, 308, 310, 312 may be prescribed and programmed into the feedback analysis system 120. More specifically, the bounds 306, 308, 310, 312 may be stored in the memory 122, and retrieved for application by the data generator 128. The bounds 306, 308, 310, 312 may be established by any variety of reasonableness standards.

In one example, an upper bounds 310 may be establish via a reasonable standard that reflects how higher humidity levels may effect a building structure or contents within the building. For instance, although a data point associated with the combined temperature and humidity criterions may be comfortable for a particular user, the humidity portion of the data point may be too high in order to preserve, for example, a piece of artwork within the unconstrained comfort zone. In order to protect the artwork, the humidity level preferred by the user may be considered unreasonable, thus the data point will fall outside of the constrained comfort zone 303B. Other examples associated with the reasonable standard may be the cost of energy of heating or cooling, dryness levels that may, for example, impact undesired static electricity, and others. It is contemplated and understood that unconstrained comfort zone 303A previously described as being an area that represents comfort for about 95% of the users, may instead be applied to the constrained comfort zone 303B. That is, the data generator 128 may execute an algorithm that achieves 95% comfort levels within the constrained comfort zone 303B.

In some situations, it may be difficult to identify a comfort zone 303A between the first and second comfort limits 301 and 302. To avoid such cases, the data generator 128 may enforce a minimum offset (e.g., a dead-band) between the first and second comfort limits 301 and 302. This would result in a forced comfort zone 303A between the first and second comfort limits 301 and 302. Alternatively, a weighting or minimization approach may be used on the first and second comfort limits 301 and 302 to minimize the total estimated discomfort.

While FIG. 3 illustrates first and second comfort limits 301 and 302 as a two-dimensional graph 300 based on two different environmental criteria (e.g., temperature and humidity), embodiments are not limited to a two-dimensional graph, but may also include multi-dimensional data sets having more than two dimensions, such as three-dimensional data sets or greater. In such embodiments, the first and second comfort limits may be arranged as three-dimensional regions, and the comfort zone may be a three-dimensional geometric shape, such as an ovoid shape, a cube shape, or any other three-dimensional shape.

The user feedback analysis module 126 further includes an outlier identifier 129. The outlier identifier 129 may identify outliers when generating the first and second comfort limits 301 and 302 and the comfort zone 303A, as well as in real-time as users 111a . . . 111n input feedback via the user feedback devices 112a . . . 112n. Outliers are user inputs indicating discomfort in which a predetermined majority of users would be comfortable. For example, in an embodiment in which the comfort zone 303A indicates that 95% of users would be comfortable (based on user feedback), a data point based on user feedback that falls within the comfort zone 303A is an outlier. In FIG. 3, user input data point 304 represents a user feedback input that is identified by the outlier identifier module 129 as an outlier.

In addition, the outlier identifier module 129 may designate user feedback generated at predetermined times as being outlier data. For example, the outlier identifier module 129 may designate any user inputs generated within an hour of the user arriving at work as being an outlier, or any inputs prior to a predetermined hour (such as 9 AM) as being an outlier. In such embodiments, the system may be configured to identify times in which the users' comfort levels may be in transition, such as from an active state in which the user travels to work, to a passive state while the user is at work, and the system builds in a transition time to allow the users to adjust physiologically to the group environment 110 prior to accepting user inputs.

In one embodiment, the user feedback analysis module 126 disregards the outlier data points, such as data point 304 when generating the first and second comfort limits 301 and 302. The feedback analysis system 120 may also include a user feedback generator 130 to generate feedback based on detecting a user feedback input that corresponds to an outlier data point. For example, the user feedback analysis module 126 may generate the regions corresponding to the graph 300 of FIG. 3, and at a later time, a user may provide feedback corresponding to data point 304, indicating that the user is uncomfortable in a region previously determined to be the comfort zone 303A. In such an embodiment, the user feedback generator 130 may generate feedback data and transmit the data to the user 111a . . . 111n via the user I/O module 123 based on determining that the user feedback corresponds to an outlier. In one embodiment, the feedback data to the user may generate one or both of graphics and a message on the user input device 112a . . . 112n to inform the user that the user's feedback corresponds to an outlier. In one embodiment, the feedback to the user informs the user that the user's feedback is outside a predetermined range of users' comfort selections, and may inform the user what the predetermined range is. The message may prompt the user to change their feedback. For example, a message may be generated to say: "95% of users are comfortable at the current environmental settings. Would you like to change your feedback?" In another embodiment, the feedback to the user may inform the user of costs associated with changing environmental settings to match the user's feedback. For example, a message may be generated to say: "During peak hours, setting the temperature in the building to 21 degrees Celsius would increase energy costs by [amount] [currency] per year. Do you want to change your feedback?"

While a few examples of feedback are provided, embodiments of the invention encompass any feedback provided from the feedback analysis system 120 to the users 111a . . . 111n via the user feedback devices 112a . . . 112n. In some embodiments, feedback may be provided via other devices. For example, a user may input feedback via a specialized user feedback device 112a . . . 112n, but feedback may be provided to the user from the feedback analysis system 120 via email (via a mobile phone, desktop computer, or any other device capable of receiving email), or any other communication method.

The feedback analysis system 120 also includes an environmental conditioning system control signal generator 131 (also "control signal generator 131"). The control signal generator 131 generates control signals to control the environmental conditioning system 140 based on the data generated by the data generator 128. In particular, referring to FIG. 3, the control signal generator 131 generates control signals to maintain the environmental conditioning system 140 in a control range within the constrained comfort zone 303B. The control signal generator 131 may determine, for example, a location within the comfort zone 303B requiring the minimum of energy usage by the environmental conditioning system 140, and may generate control signals to maintain the environmental conditioning system at that level. For example, on a warmer day, the operating level may be closer to the high-temperature end of the comfort zone 303B, and on a low-temperature day the operating level may be closer to the low-temperature end of the comfort zone 303B to conserve energy.

In yet another embodiment, the data generator 128 may be configured to formulate a maximum comfort setpoint 314 within the constrained comfort zone 303B. The maximum comfort setpoint may be associated with both a humidity setting and a temperature setting. In one example, the formulation of the maximum comfort setpoint 314 may be accomplished by averaging the data points used to formulate the first and second comfort limits 301, 302, and that lie within the constrained comfort zone 303B. The data generator 128 may also formulate a minimum energy setpoint 316 that lies within the constrained comfort zone 303B, and represents a combined humidity and temperature settings achievable with minimal energy consumption by the environmental conditioning system 140

In one example, the minimum energy setpoint 316 associated with temperature and humidity may be established by calculating the enthalpies of all data points that lie within the constrained comfort zone 303A. The enthalpy of each data point may is then compared to the enthalpy of external ambient air (i.e., adjacent unconditioned air). The data point with the closest enthalpy value to the enthalpy value of the external ambient air may then be used as the minimum energy setpoint 316.

With the maximum comfort setpoint 314 and the minimum energy setpoint 316 established, the data generator 128 may then select a control setpoint 318 that lies directly between, or is one of, the setpoints 314, 316. That is, the setpoint 318 may lie alont a linear line drawn between the setpoints 314, 316. The control signal generator 131 may then generate control signals to maintain the environmental conditioning system 140 in a control range at, or proximate to the control setpoint 318.

In embodiments of the invention, user inputs may be weighted, to give a higher level of influence over operating conditions of the environmental conditioning system 140 to particular inputs. In some embodiments, the weighting of the user inputs is user-specific. For example, a first user (such as a leader at a company or a facilities manager) may have a greater influence over operating conditions than other employees. Alternatively, users that provide more feedback may be given greater weight than those that provide little feedback, or vice versa (i.e. users that provide less feedback may be given greater weight than those that provide much feedback). In yet other embodiments, user inputs may be given different weights based on locations of users in the group environment 110, a time of day, or any other criteria. In one embodiment, the weight assigned to the user input varies based on a user selection. For example, a user input of "much too warm" may be given a greater weight than "somewhat too warm."

In one embodiment, data points identified as outliers are given lesser weight than data points that are not outliers. In other words, instead of entirely disregarding outliers, the data generator 128 may form the first and second comfort limits 301 and 302 taking into account outliers, but giving them less influence on the shape of the comfort limits 301 and 302 than data points that are not outliers. In addition, over time weights assigned to different user inputs may be changed. For example, a particular user may be assigned a greater weight after a period of time such that the inputs generated by the user are given greater weight, or the user may be assigned a lesser weight. In addition, user preferences may evolve over time, such that user inputs that are initially outliers (for example, in an embodiment in which outliers are defined as inputs falling outside 95% of user preferences, the user input falls outside 95% of user preferences) may over time become non-outliers (i.e. may fall within 95% of user preferences in the aforementioned embodiment). Accordingly, a weight assigned to the inputs may be analyzed regularly to keep the system operating based on up-to-date group feedback.

In embodiments of the invention, the weight assigned to user inputs may affect the influence corresponding data points in a data set or graph 300 have on the shapes of the comfort limits 301 and 302. For example, a data point associated with a user input having a greater weight may have a greater influence on the shape of the first and second comfort limits 301 and 302 than a data point associated with a user input having a lesser weight. In turn, user inputs having a greater weight have a greater influence on the operating range of the environmental conditioning system 140 than user inputs having a lesser weight.

Figure 4:
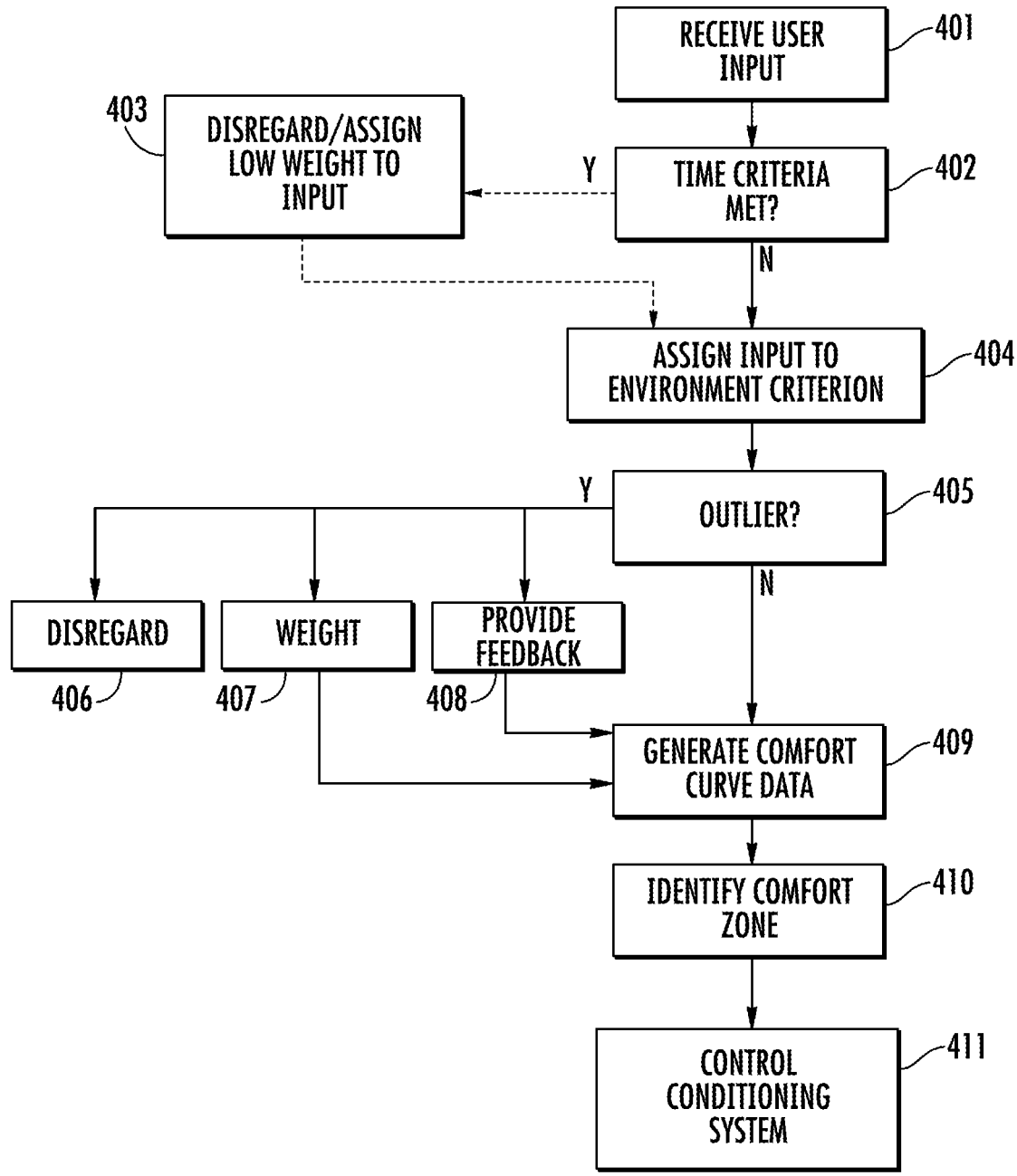
FIG. 4 is a flow diagram of a method according to an embodiment of the invention.

FIG. 4 is a flow diagram of a method according to an embodiment of the invention. In block 401, one or more user inputs are received. The user inputs may be received via user feedback devices, such as remote input devices, handheld smartphones, desktop computers or laptops, or any other devices capable of receiving a user input indicating a comfort or discomfort level of the user.

In block 402, it is determined whether the user inputs match predetermined time criteria. For example, it may be determined whether the user inputs were received within a predetermined time of a previous user input from the same user, at a predetermined time of day, within a predetermined period of time of a user arriving in a group environment from outside the group environment, or any other predetermined time criteria that may affect a user's perception of the group environment. If it is determined that the time criterion is met, then, in block 403, the user input may be disregarded in the subsequent blocks of analyzing user inputs. Alternatively, other actions may be performed on the user input, such as assigning a particular weight to the user input based on the time criteria. If the time criteria are not met, then the process proceeds to block 404.

In block 404, the user input is associated with one or more environmental criteria. For example, the time of the user input may be determined, and a set temperature and humidity for the group environment may be determined at the time of the user input. However, embodiments of the invention encompass any one or more environmental criteria.

At block 405, it is determined whether the user input is an outlier. For example, in one embodiment, an outlier may be defined as an input that is outside a predetermined percentage of user preferences. For example, it may be defined as an input outside 95% of user preferences or 97% of user preferences. If the user input is determined to be an outlier, or to correspond to an outlier data point of comfort limits, then one or more outlier actions may be taken. In one embodiment, the user input that is the outlier is disregarded in block 406 and is not considered for generating a comfort limits in block 409 or for controlling an environmental conditioning system in block 411. In another embodiment, the user input corresponding to the outlier is assigned a lesser weight in block 407 than user inputs that are not outliers. In another embodiment in block 408, a user feedback message is generated and sent to a user. The user feedback message may notify the user than the user input corresponds to an outlier, may notify the user of energy costs associated with the user input, and may provide the user with an option to change the user input. However, embodiments are not limited to these described outlier functions 406, 407, or 408.

If the user input is determined not to be an outlier, or after performing one or more of the outlier functions 406, 407, and 408, a comfort limit is generated in 409. A comfort limit includes data corresponding to first comfort limit at a first extreme of an environmental criterion, a second comfort limit at an opposite extreme of the environmental criterion. A unconstrained comfort zone 303A defined by the first and second comfort limit is identified in block 410. Furthermore, the upper and lower bounds for each of two environmental criterion may be applied or masked over the unconstrained comfort zone 303A to provide a constrained comfort zone 303B.

In block 411, the environmental conditioning system 140 is controlled to operate within the identified comfort zone. The comfort zone may be the constrained comfort zone 303B. Furthermore, the environmental condition system 140 may be controlled to operate at, or proximate too, the control setpoint 318.

In a first instance, such as at start-up or after an initialization, operations 401-411 may be repeated until each user feedback input stored in memory is analyzed. Once the stored data is analyzed and the comfort limit generated and the comfort zone identified, subsequent user inputs may be analyzed in real-time, or at any predetermined time interval to further control the environmental conditioning system.

Embodiments of the invention relate to modeling a one-class multi-linear classifier to model the thermal comfort of a group of people. In embodiments, a first comfort limit is generated based on user inputs of the group of people indicating that an environment is too cold. A second comfort limit is generated based on the user inputs of the group of people indicating that the environment is too warm or too hot. Based on the boundaries of the first comfort limit and the second comfort limit, a comfort zone is identified, and an environmental control system is controlled to operate in the comfort zone.

A system that accommodates a group of users differs from a system that accommodates a single user in a number of ways. First, the system may have only one setting that accommodates multiple users, such as a single temperature level for multiple users. However, different regions of an environment may have different conditions, such as different temperatures or humidity levels. In addition, each user has different tolerances for the environmental conditions, such as different preferred temperature or humidity levels. Therefore, a single temperature or humidity level, or combination of temperature and humidity level, may result in different or conflicting user feedback.

In a group-controlled system, the different and conflicting feedback is analyzed to obtain an optimal environment setting. For example, a first comfort limit may be generated to represent combinations of temperature and humidity that resulted in user feedback complaints that the environment was too cold, or otherwise too uncomfortable. A second comfort limit may be generated to represent combinations of temperature and humidity that resulted in user feedback complaints that the environment was too hot, or otherwise too uncomfortable.

In some groups, some users will generate feedback that is outside a norm. For example, 80% or 90% of users may find a particular region (e.g. a "comfort zone") of a comfort graph that graphs humidity versus temperature comfortable, as indicated by registering complaints on either side of the comfort zone, but not within the comfort zone. Accordingly, when user complaints are registered by the minority of users within the comfort zone, the feedback may be disregarded by an environmental feedback analysis unit or environmental control system. Alternatively, the system may provide further feedback to the complaining users to notify them that their complaint represents an outlier. For example, a message may be displayed on the user input device to notify the user that their complaint is an outlier and would they like to withdraw the complaint? Alternatively, the message could inform the user of the energy costs associated with maintaining the environment at the level indicated by the user complaint (such as at a temperature warmer than a temperature at which a "too cold" complaint is registered).

In some embodiments, other user inputs are discarded when deriving the comfort limits, such as the first user input for each user in a particular day, or user inputs before a particular time of the day. By disregarding user inputs before a certain time of day, or by disregarding a first input of the day, the users' physiological states upon arriving in a working environment (immediately after a transition period of travel to the environment) may be disregarded when deriving the comfort limits, and instead the users' physiological states after they have stayed in the environment for a predetermined period of time may be analyzed. The user inputs, although disregarded in generating the comfort limits, are still used by the environmental conditioning system 140.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of conditioning an environment, comprising:
generating, by a group feedback analysis system, a first comfort limit based on a first plurality of data points each associated with a temperature environmental criterion combined with a humidity environmental criterion, and corresponding to user comfort feedback of a group of users in an environment conditioned by an environmental conditioning system;
generating, by the group feedback analysis system, a second comfort limit based on a second plurality of data points each associated with the temperature environmental criterion combined with the humidity environmental criterion, and corresponding to user comfort feedback of the group of users in the environment, wherein the first comfort limit is opposite the second comfort limit;
identifying, by the group feedback analysis system, a preprogrammed constrained comfort zone located between the first and second comfort limits, wherein the preprogrammed constrained comfort zone is defined by and located between lower and upper bounds for the temperature environmental criterion, and is defined by and located between lower and upper bounds for the humidity environmental criterion, and wherein the preprogrammed constrained comfort zone is not established based on user comfort;
receiving, at a user input device, user input registering a comfort level of a user;
identifying a value of the combined temperature and humidity environmental criterions associated with an environment of the user and the user input as being an outlier relative to at least one of the first comfort limit, the second comfort limit, and the preprogrammed constrained comfort zone;

disregarding the user input based on identifing the value of the combined temperature and humidity environmental criterion as being an outlier; and controlling the environmental conditioning system to maintain the temperature and humidity environmental criterions within the preprogrammed constrained comfort zone and between the first and second comfort limits.

2. The method of claim 1, wherein generating the first comfort limit comprises analyzing the first plurality of data points to identify outliers, and forming the first comfort and second comfort limits to exclude the outliers.

3. The method of claim 2, further comprising:
providing feedback to the user at the user input device indicating that the value of the combined temperature and humidity environmental criterions associated with the environment of the user is an outlier.

4. The method of claim 3, further comprising:
generating a prompt on the user input device to prompt the user to change the user input to correspond to a different value of the combined temperature and humidity environmental criterion.

5. The method of claim 1, further comprising:
assigning a weight to each user input making up the user feedback of the group of users.

6. The method of claim 5, wherein the weight is assigned based on at least one of (i) an identity of a user associated with the user input, (ii) a duration of time that the user is in an environment associated with the user, and (iii) a number of complaints, defined as user feedback inputs indicating discomfort, generated by the user.

7. The method of claim 1, wherein generating the first and second comfort limits comprises:
receiving a plurality of user inputs to a plurality of user input devices;
sensing values of the temperature and humidity environmental criterions in one or more enclosed environments based on the plurality of user inputs;
associating the user inputs with the sensed values of the temperature and humidity environmental criterions and the preprogrammed constrained comfort zone; and
generating the first and second comfort limits based on the sensed values of the temperature and humidity environmental criterions.

8. The method of claim 1, further comprising:
establishing, by the group feedback analysis system, a minimum energy setpoint for the combined temperature and humidity environmental criterions within the preprogrammed constrained comfort zone;
establishing, by the group feedback analysis system, a maximum comfort setpoint for the combined temperature and humidity environmental criterions within the preprogrammed constrained comfort zone; and selecting a control setpoint directly located between the minimum energy and maximum comfort setpoints for control of the environmental conditioning system.

9. The method of claim 8, wherein establishing the minimum energy setpoint comprises:
establishing the enthalpy of external ambient air;
calculating enthalpies of the first and second plurality of data points that lie within the preprogrammed constrained comfort zone; and selecting a data point having the closest enthalpy to the enthalpy of the external ambient air as the minimum energy setpoint.

10. The method of claim 8, wherein establishing the maximum comfort setpoint comprises: averaging the first and second plurality of data points that lie within the preprogrammed constrained comfort zone.

11. An environmental control system, comprising:
a feedback analysis system configured to receive comfort feedback from a group of users corresponding to a comfort level of the users in a group environment in which the group of users is located, to generate data including a first comfort limit and a second comfort limit, the first comfort limit corresponding to the comfort feedback from the group of users at a first extreme of a combined temperature and humidity environmental criterions and the second comfort limit corresponding to the comfort feedback from the group of users at a second extreme of the combined temperature and humidity environmental criterions opposite the first extreme, and the feedback analysis system further configured to identify a preprogrammed constrained comfort zone bounded by the first comfort limit, the second comfort limit, wherein the preprogrammed constrained comfort zone is defined by and located between upper and lower bounds of the temperature environmental criterion, and is defined by and located between upper and lower bounds of the humidity environmental criterion,
a user input device to receive a user input registering a comfort level of a user, wherein the feedback analysis system is configured to identify a value of the combined temperature and humidity environmental criterions associated with an environment of the user and the user input as being an outlier relative to at least one of the first comfort limit, the second comfort limit, and the preprogrammed constrained comfort zone, and disregard the user input based on the value of the combined temperature and humidity environmental criterion being identified as an outlier, and wherein the feedback analysis system is configured to generate control signals for an environmental conditioning system to maintain the group environment within the preprogrammed constrained comfort zone and between the first and second comfort limits, and wherein the preprogrammed constrained comfort zone is not established based on user comfort.

12. The environmental control system of claim 11, wherein the feedback analysis system is configured to identify outlier user feedback data points and to form the first and second comfort limits to exclude the outlier user feedback data points.

13. The environmental control system of claim 12, further comprising:
one or more user input devices to receive inputs from users registering a comfort level of the users, wherein the feedback analysis system is configured to generate user feedback data points by identifying temperature and humidity values of the respective temperature and humidity environmental criterions associated with an environment of the users based on the inputs received from the users.

14. The environmental control system of claim 11, wherein the feedback analysis system is configured to assign a weight to each user input making up the user feedback of the group of users.

15. The environmental control system of claim 11, wherein the first comfort limit and the second comfort limit are retrieved from a user profile, wherein the user profile is stored on a user device located in the group environment, stored on a remote server or stored in a cloud environment.

16. The environmental control system of claim 11, wherein the feedback analysis system is configured to establish a minimum energy setpoint for the combined temperature and humidity environmental criterions within the preprogrammed constrained comfort zone, establish a maximum comfort setpoint for the combined temperature and humidity environmental criterions within the preprogrammed constrained comfort zone, and select a control setpoint directly located between the minimum energy and maximum comfort setpoints for control of the environmental conditioning system.

17. The environmental control system of claim 16, wherein the feedback analysis system is configured to establish an ambient air enthalpy, calculate data point enthalpies for each of the first and second data points that lie within the preprogrammed constrained comfort zone, and select a data point having the closest data point enthalpy to the ambient air enthalpy as the minimum energy setpoint.

18. The environmental control system of claim 17, wherein the feedback analysis system is configured to establish the maximum comfort setpoint by averaging the first and second plurality of data points that lied within the preprogrammed constrained comfort zone.

\* \* \* \* \*